(12) United States Patent
Vissers et al.

(10) Patent No.: US 8,681,805 B2
(45) Date of Patent: Mar. 25, 2014

(54) METHOD, DEVICE AND SYSTEM FOR INTERCONNECTING A MULTI-PROTOCOL LABEL SWITCHING NETWORK AND AN ETHERNET

(75) Inventors: Maarten Vissers, Amsterdam (NL); Hao Long, Chengdu (CN); Haiyan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 13/355,868

(22) Filed: Jan. 23, 2012

(65) Prior Publication Data

US 2012/0120955 A1 May 17, 2012

Related U.S. Application Data

(63) Continuation of application No. PCT/CN2010/075649, filed on Aug. 3, 2010.

(30) Foreign Application Priority Data

Sep. 9, 2009 (CN) .......................... 2009 1 0169430

(51) Int. Cl.
*H04L 12/28* (2006.01)
(52) U.S. Cl.
USPC ....................................................... 370/409
(58) Field of Classification Search
USPC ................. 370/389, 390, 392, 400, 401, 409; 709/220, 224
See application file for complete search history.

(56) References Cited

U.S. PATENT DOCUMENTS 8,050,279 B2 * 11/2011 Li et al. ...................... 370/395.5
2005/0265355 A1 * 12/2005 Havala et al. ............ 370/395.53
(Continued)

FOREIGN PATENT DOCUMENTS

CN          1822570 A       8/2006
CN          1863074 A       11/2006
(Continued)

OTHER PUBLICATIONS

Martini, et al., "Encapsulation Methods for Transport of Ethernet over MPLS Networks," RFC 4448, The Internet Society, Apr. 2006.

(Continued)

*Primary Examiner* — Kerri Rose
(74) *Attorney, Agent, or Firm* — Leydig, Voit & Mayer, Ltd.

(57) ABSTRACT

A method, a device and a system for interconnecting a multi-protocol label switching (MPLS) network and an Ethernet are provided. A packet sent by a node located at the Ethernet is received, the packet is parsed, the parsed packet is re-encapsulated by means of MPLS, and the re-encapsulated packet is sent to a node located at the MPLS network, so as to implement interconnection between the MPLS network and the Ethernet. A reverse solution is similar to this. An intermediate node in the solution adopts a manner of parsing a packet and then re-encapsulating the packet when the packet is sent from one network to another network, instead of transparent transmission only. Therefore, it is unnecessary to configure a Media Access Control (MAC) address of a remote node on a node located at the Ethernet and to configure Ethernet information on a node located at the MPLS network.

10 Claims, 3 Drawing Sheets

(56) References Cited

U.S. PATENT DOCUMENTS

| | | |
|---|---|---|
| 2006/0182113 A1 | 8/2006 | Liang et al. |
| 2007/0153799 A1* | 7/2007 | Sorrini et al. .............. 370/395.1 |
| 2008/0144657 A1 | 6/2008 | Li |
| 2008/0172497 A1 | 7/2008 | Mohan et al. |
| 2008/0212595 A1 | 9/2008 | Figueira et al. |
| 2009/0041023 A1 | 2/2009 | Ould et al. |
| 2010/0220739 A1 | 9/2010 | Ishiguro |

FOREIGN PATENT DOCUMENTS

| | | |
|---|---|---|
| CN | 101217470 A | 7/2008 |
| CN | 101505227 A | 8/2009 |
| WO | WO 2009/051179 A1 | 4/2009 |

OTHER PUBLICATIONS

Andersson et al., "Use of the Gnerealized Multi-Protocol Label Switching control plane for point-to-point Ethernet Label Switching," The Internet Society, Oct. 2005.

Stein, et al., "Time Division Multiplexing over IP (TDMoTP)" The Internet Society, Dec. 2007.

Extended European Search Report dated (mailed) Feb. 16, 2012, issued in related Application No. 10814954.3-2416, PCT/CN2010075649, Hauwei Technologies Co., Ltd.

Written Opinion of the International Searching Authority (translation) dated (mailed) Nov. 18, 2010, issued in related Application No. PCT/CN2010/075649, filed Aug. 3, 2010, Huawei Technologies Co., Ltd.

International Search Report for International Application No. PCT/CN2010/075649, mailed Nov. 18, 2010, Huawei Technologies Co., Ltd.

$1^{st}$ Office Action in corresponding Chinese Patent Application No. 200910169430.5 (Oct. 23, 2012).

$2^{nd}$ Office Action in corresponding Chinese Patent Application No. 200910169430.5 (Apr. 15, 2013).

\* cited by examiner

FIG. 9

METHOD, DEVICE AND SYSTEM FOR INTERCONNECTING A MULTI-PROTOCOL LABEL SWITCHING NETWORK AND AN ETHERNET

CROSS-REFERENCE TO RELATED APPLICATIONS

This application is a continuation of International Application No. PCT/CN2010/075649, filed on Aug. 3, 2010, which claims priority to Chinese Patent Application No. 200910169430.5, filed with the Chinese Patent Office on Sep. 9, 2009, all of which are hereby incorporated by reference in their entireties.

FIELD OF THE INVENTION

The present invention relates to the field of communications technologies, and in particular, to a method, a device and a system for interconnecting a multi-protocol label switching (MPLS) network and an Ethernet.

BACKGROUND OF THE INVENTION

The Ethernet (ETH) technology and the MPLS technology are two widely-used packet switching technologies. The ETH technology has been used in an access network before. The MPLS technology is used in a core network, and it is a convergence network of Synchronous Digital Hierarchy/Synchronous Optical Network (SDH/SONET) in the middle. As the SDH/SONET is gradually phased out, the Ethernet and the MPLS network gradually replace the SDH/SONET, so that the Ethernet and the MPLS network begin to be connected together, and the situation that the Ethernet and the MPLS network are interconnected become more common.

The Virtual Private Local Area Network (LAN) Service (VPLS) is a technology widely used at present, which implements traversal of Ethernet in the MPLS network in a manner of ETH over MPLS. Such a manner performs encapsulation using pseudo wire (PW) labels, and Ethernet packets are encapsulated in PWs and then are mapped onto an MPLS Label Switching Path (LSP). The description is provided by taking one service traversing an Ethernet and an MPLS network through points A, B and C as an example, which is specifically as follows.

After receiving a service packet encapsulated by means of Ethernet sent by Node A located at an Ethernet, Node B re-encapsulates the service packet by means of MPLS and then sends the packet to Node C located at an MPLS network, and Node C decapsulates the service packet. In this process, Node A needs to encapsulate a Virtual LAN (VLAN) address, a Media Access Control (MAC) address of Node A and a MAC address of Node C in the service packet, and Node C needs to obtain the VLAN address in addition to the MAC address of Node C and the MAC address of Node A, so as to decapsulate the received service packet. In the VPLS technology, the VLAN information needs to be configured at the MPLS side and remote MAC address information needs to be configured at the Ethernet.

Since it is necessary to configure VLAN information at the MPLS side and to configure remote MAC address information at the Ethernet side, the configuration is relatively complicated.

SUMMARY OF THE INVENTION

Embodiments of the present invention provide a method, a device and a system for interconnecting an MPLS network and an Ethernet, so as to lower the configuration complexity when the MPLS network and the Ethernet are interconnected.

A method for interconnecting an MPLS network and an Ethernet is provided, where the method includes:
receiving a packet sent by a first node located at the Ethernet, in which an Ethernet label is encapsulated in the packet;
switching the Ethernet label in the packet to a pseudo wire (PW) label according to a preset mapping relationship between Ethernet labels and PW labels;
performing MPLS encapsulation on the packet in which the label has been switched; and
sending the encapsulated packet to a third node located at the MPLS network.

A method for interconnecting an MPLS network and an Ethernet is provided, where the method includes:
receiving label mapping signaling sent by a first node located at the Ethernet, in which an Ethernet label for identifying a first hop PW is encapsulated in the label mapping signaling;
generating new label mapping signaling and a PW label for identifying a second hop PW according to the label mapping signaling, encapsulating the PW label in the new label mapping signaling, and establishing a corresponding relationship between the Ethernet label and the PW label; and
sending the new label mapping signaling to a third node located at the MPLS network.

A method for interconnecting an MPLS network and an Ethernet is provided, where the method includes:
receiving a packet sent by a third node located at the MPLS network, in which a PW label is encapsulated in the packet;
switching the PW label in the packet to an Ethernet label according to a preset mapping relationship between Ethernet labels and PW labels;
performing Ethernet encapsulation on the packet in which the label has been switched; and
sending the encapsulated packet to a first node located at the Ethernet.

A method for interconnecting an MPLS network and an Ethernet is provided, where the method includes:
receiving label mapping signaling sent by a third node located at the MPLS network, in which a PW label for identifying a second hop PW is encapsulated in the label mapping signaling;
generating new label mapping signaling and an Ethernet label for identifying a first hop PW according to the label mapping signaling, encapsulating the Ethernet label in the new label mapping signaling, and establishing a corresponding relationship between the Ethernet label and the PW label; and
sending the new label mapping signaling to a first node located at the Ethernet.

A network device is provided, where the device includes:
a first receiving unit, configured to receive a packet sent by a first node located at an Ethernet, in which an Ethernet label is encapsulated in the packet;
a first parsing unit, configured to strip a MAC tag of the packet received by the first receiving unit, and switch the Ethernet label in the packet to a PW label according to a preset mapping relationship between Ethernet labels and PW labels;
a first encapsulating unit, configured to perform MPLS encapsulation on the packet in which the first parsing unit has switched the label; and
a first sending unit, configured to send the packet encapsulated by the first encapsulating unit to a third node located at an MPLS network.

A network device is provided, where the device includes:

a second receiving unit, configured to receive a packet sent by a third node located at an MPLS network, in which a PW label is encapsulated in the packet;

a second parsing unit, configured to switch the PW label in the packet received by the second receiving unit to an Ethernet label according to a preset mapping relationship between Ethernet labels and PW labels;

a second encapsulating unit, configured to perform Ethernet encapsulation on the packet in which the second parsing unit has switched the label; and a second sending unit, configured to send the packet encapsulated by the second encapsulating unit to a first node located at an Ethernet.

A network device is provided, where the device includes:

a third receiving unit, configured to receive label mapping signaling sent by a first node located at an Ethernet, in which an Ethernet label for identifying a first hop PW is encapsulated in the label mapping signaling;

a third processing unit, configured to generate new label mapping signaling and a PW label for identifying a second hop PW according to the label mapping signaling received by the third receiving unit, encapsulate the PW label in the new label mapping signaling, and establish a corresponding relationship between the Ethernet label and the PW label; and a third sending unit, configured to send the new label mapping signaling encapsulated by the third processing unit to a third node located at an MPLS network.

A network device is provided, where the device includes:

a fourth receiving unit, configured to receive label mapping signaling sent by a third node located at an MPLS network, in which a PW label for identifying a second hop PW is encapsulated in the label mapping signaling;

a fourth processing unit, configured to generate new label mapping signaling and an Ethernet label for identifying a first hop PW according to the label mapping signaling received by the fourth receiving unit, encapsulate the Ethernet label in the new label mapping signaling, and establish a corresponding relationship between the Ethernet label and the PW label; and a fourth sending unit, configured to send the new label mapping signaling encapsulated by the fourth processing unit to a first node located at an Ethernet.

A communication system is provided, where the system includes a first network device, a second network device and a third network device, in which:

the first network device is configured to send a packet to the second network device, in which an Ethernet label is encapsulated in the packet;

the second network device is configured to receive the packet sent by the first network device located at an Ethernet, switch the Ethernet label in the packet to a PW label according to a preset mapping relationship between Ethernet labels and PW labels, perform MPLS encapsulation on the packet in which the label has been switched, and send the encapsulated packet to the third network device located at an MPLS network; and the third network device is configured to receive the packet sent by the second network device and parse the packet.

A communication system is provided, where the system includes a first network device, a second network device and a third network device, in which:

the third network device is configured to send a packet to the second network device, in which a PW label is encapsulated in the packet;

the second network device is configured to receive the packet sent by the third network device located at an MPLS network, switch the PW label in the packet to an Ethernet label according to a preset mapping relationship between Ethernet labels and PW labels, perform Ethernet encapsulation on the packet in which the label has been switched, and send the encapsulated packet to the first network device located at an Ethernet; and the first network device is configured to receive the packet sent by the second network device and parse the packet.

According to the embodiments of the present invention, a packet sent by a node located at the Ethernet is received, the packet is parsed, the parsed packet is re-encapsulated by means of MPLS, and the re-encapsulated packet is sent to a node located in the MPLS network, so as to implement interconnection between the MPLS network and the Ethernet. A reverse solution is similar to this. An intermediate node in the solution adopts a manner of parsing a packet and then re-encapsulating the packet when the packet is sent from one network to another network, instead of transparent transmission only. Therefore, it is unnecessary to configure a MAC address of a remote node on a node located at the Ethernet and to configure Ethernet information, for example, VLAN information, on a node located at the MPLS network, which may lower the configuration difficulty greatly.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art may obtain other drawings according to the accompanying drawings without creative efforts.

DETAILED DESCRIPTION OF THE EMBODIMENTS

The technical solution of the present invention will be clearly and fully described below with reference to the accompanying drawings. It is obvious that the embodiments to be described are only a part rather than all of the embodiments of the present invention. Persons of ordinary skill in the art may derive other embodiments based on the embodiments of the present invention without creative efforts, which all fall within the scope of the present invention.

Embodiments of the present invention provide a method, a device and a system for interconnecting an MPLS network and an Ethernet. Description is provided in detail in the following.

Embodiment 1

Embodiment 1 of the present invention gives description from the angle of a second node, that is, a node connecting two different networks, for example, an MPLS network and an Ethernet. In this embodiment, description is mainly given by taking that a packet enters the MPLS network from the Ethernet as an example. A first node is located at the Ethernet. A third node is located at the MPLS network.

Figure 1:
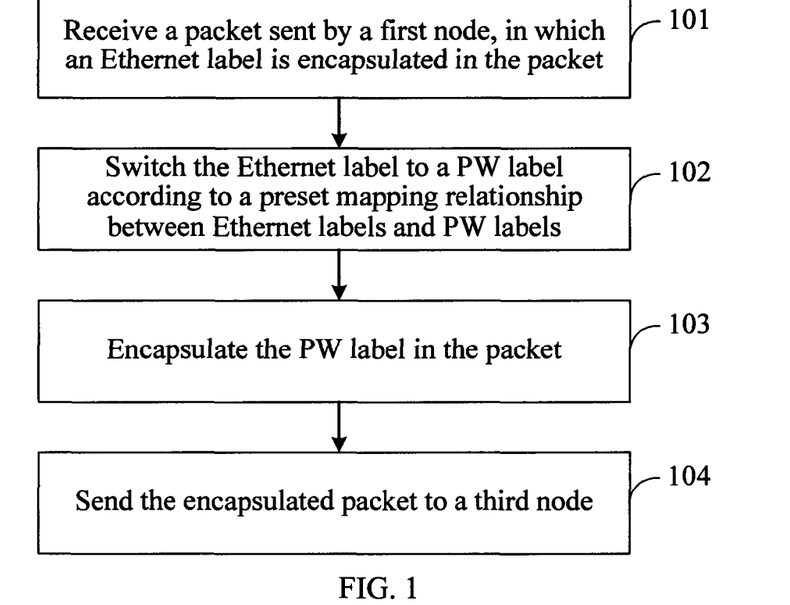
FIG. 1 is a flow chart of a method according to Embodiment 1 of the present invention.

A method for interconnecting an MPLS network and an Ethernet is provided, where the method includes: receiving a packet sent by a first node located at the Ethernet, in which an Ethernet label is encapsulated in the packet; switching the Ethernet label in the packet to a PW label according to a preset mapping relationship between Ethernet labels and PW labels; performing MPLS encapsulation on the packet in which the label has been switched; and sending the encapsulated packet to a third node located at the MPLS network. As shown in FIG. 1, the specific process may be as follows.

Step 101: Receive a packet encapsulated by mean of Ethernet sent by a first node. An Ethernet label is encapsulated in the packet. The Ethernet label in the embodiment of the present invention may be a VLAN tag, or an I-SID tag (backbone service instance tag) or a MAC address when the VLAN serves as a tunnel tag. For ease of description, the embodiments of the present invention all takes the Ethernet label as the VLAN tag as an example for description.

For example, a service packet sent by the first node is received, in which a VLAN tag is encapsulated in the service packet; or An operation, administration and management (OAM) packet sent by the first node is received, in which a VLAN tag is encapsulated in the OAM packet.

Step 102: Parse the received packet encapsulated by means of Ethernet, that is, switch the Ethernet label, for example, the VLAN tag, in the packet to a PW label according to a preset mapping relationship between Ethernet labels, for example VLAN tags, and PW labels. Certainly, it is necessary to strip a MAC tag of the received service packet or the OAM packet. Specifically, a VLAN tag and an Ethernet header (that is, the MAC tag) of a packet are stripped, and then a PW label and an LSP label in the packet are encapsulated.

The mapping relationship between Ethernet labels, for example VLAN tags, and PW labels may be preset according to a policy, or be established through signaling, for example, the first node may carry in a service packet explicit route object (ERO) information for indicating a next hop destination node (for example, a third node) when the service packet is sent to a second node, and after receiving the service packet, the second node may generate label mapping signaling according to the ERO information and establish a corresponding relationship between VLAN tags and PW labels, in which the label mapping signaling carries a PW label.

Step 103: Encapsulate the parsed packet by means of MPLS (referred to as MPLS encapsulation for short), that is, perform MPLS encapsulation on the packet in which the label has been switched.

If the packet received in Step 101 is the service packet, MPLS encapsulation may be performed on the service packet in which the label has been switched at this time. Alternatively, if the packet received in step 101 is the OAM packet, at this time, an Ethernet protocol data unit (PDU, also called protocol data packet) format may be converted into an MPLS PDU format, and then MPLS encapsulation is performed. Information such as a corresponding operation code (opcode) shall also be converted. Further, if the packet is the OAM packet that concerns an intermediate node, it is necessary to place information of a destination address (DA) and a source address (SA) in an Ethernet OAM packet header into a PW OAM PDU (also called protocol data packet).

The step of "placing information of a DA and an SA in an Ethernet OAM packet header into a PW OAM PDU" and the label switching (that is, step 102) are not bound to a strict sequence. Step 102 may be performed first, and then the information of the DA and the SA in an Ethernet OAM packet header is placed into a PW OAM PDU. Alternatively, the information of the DA and the SA in an Ethernet OAM packet header is placed into a PW OAM PDU first, and then step 102 is performed.

Step 104: Send the packet encapsulated by means of MPLS to the third node, that is, send the service packet or OAM packet encapsulated in step 103 to the third node located at the MPLS network.

Subsequently, the third node receives the service packet sent by the second node, and parses the received packet to obtain payload in the packet.

In view of the above, in the embodiment of the present invention, a packet sent by a node located at an Ethernet is received, the packet is parsed, and the parsed packet is re-encapsulated by means of MPLS, that is, an Ethernet label is switched to a PW label according to a preset mapping relationship between Ethernet labels and PW labels, MPLS encapsulation is performed on the packet in which the label has been switched, and then the re-encapsulated packet is sent to a node located at an MPLS network, so as to implement interconnection between the MPLS network and the Ethernet. An intermediate node in the solution may parse a packet and then re-encapsulate the packet when sending the packet from one network to another network, instead of transparent transmission only. Therefore, it is unnecessary to configure a MAC address of a remote node on a node located at the Ethernet and to configure Ethernet information, for example, VLAN information, on a node located at the MPLS network, which may lower the configuration difficulty significantly.

Embodiment 2

The embodiment of the present invention gives description from the angle of a second node, that is, a node connecting two different networks, for example, an MPLS network and an Ethernet. In this embodiment, description is mainly given taking that a packet enters the Ethernet from the MPLS network as an example. A first node is located at the Ethernet, and a third node is located at the MPLS network.

Figure 2:
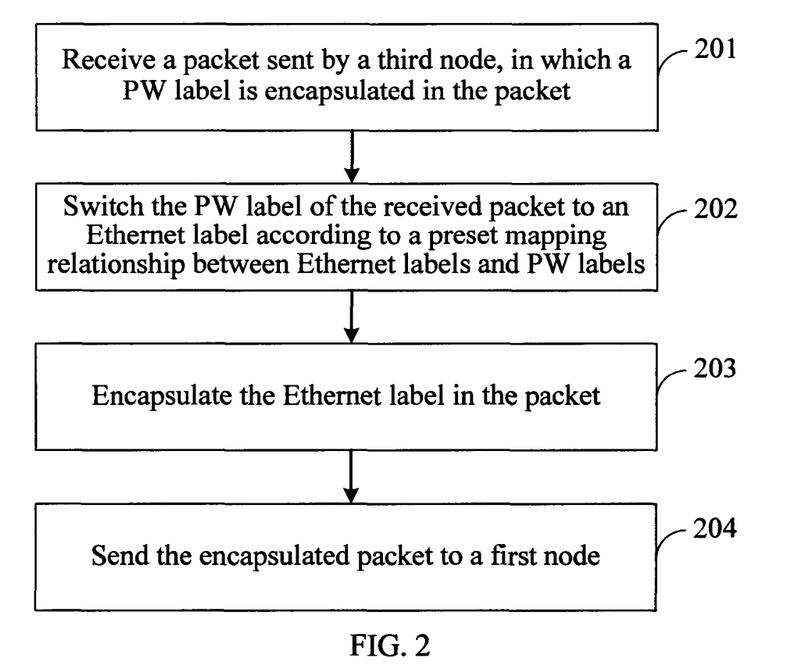
FIG. 2 is a flow chart of a method according to Embodiment 2 of the present invention.

A method for interconnecting an MPLS network and an Ethernet is provided, where the method includes: receiving a packet sent by a third node located at the MPLS network, in which a PW label is encapsulated in the packet; switching the PW label in the packet to an Ethernet label according to a preset mapping relationship between Ethernet labels and PW labels; performing Ethernet encapsulation on the packet in which the label has been switched; and sending the encapsulated packet to a first node located at the Ethernet. As shown in FIG. 2, the specific process may be as follows.

Step 201: Receive a packet encapsulated by means of MPLS sent by a third node located at an MPLS network, in which a PW label is encapsulated in the packet.

For example, a service packet sent by the third node is received, in which a PW label is encapsulated in the service packet.

Alternatively, an OAM packet sent by the third node is received, in which the OAM packet encapsulates a PW label.

Step 202: Parse the received packet encapsulated by means of MPLS, that is, switch the PW label in the packet to an Ethernet label according to a preset mapping relationship between Ethernet labels and PW labels. For example, the PW label in the received packet is switched to a VLAN tag according to a preset mapping relationship between VLAN tags and PW labels. At this time, determine a corresponding MAC tag. For example, the PW label in the received service packet or OAM packet is switched to a VLAN tag according to a preset mapping relationship between Ethernet labels, for example, VLAN tags, and PW labels.

The mapping relationship between Ethernet labels, for example, VLAN tags, and PW labels may be preset according to a policy, or be established through signaling, and reference may be made to the establishment method in Embodiment 1, which is not repeated here.

Step 203: Encapsulate the parsed packet by means of Ethernet (referred to as Ethernet encapsulation), that is, perform Ethernet encapsulation on the packet in which the label has been switched.

For example, if the packet received in step 201 is the service packet, Ethernet encapsulation is performed on the service packet in which the label has been switched.

Or, if the packet received in step 201 is the OAM packet, at this time, Ethernet encapsulation may be performed on the OAM packet in which the label has been switched, and an MPLS PDU format may be converted into an Ethernet PDU format. Information such as a corresponding opcode shall also be converted. Further, if the packet is the OAM packet that concerns an intermediate node, it is also necessary to parse content of a PW OAM PDU and then place the content into information of a DA and an SA in an Ethernet OAM packet header.

Step 204: Send the packet encapsulated by means of Ethernet to a first node; that is, send the service packet or OAM packet encapsulated in step 203 to the first node located at the MPLS network.

Subsequently, the first node receives the packet sent by the second node, and parses the received packet to obtain payload in the service packet.

In view of the above, in the embodiment of the present invention, a packet sent by a node located at an MPLS network is received, the packet is parsed, and the parsed packet is re-encapsulated by means of Ethernet, that is, a PW label is switched to an Ethernet label, for example, a VLAN tag, according to a preset mapping relationship between Ethernet labels, for example, VLAN tags, and PW labels, Ethernet encapsulation is performed on the packet in which the label has been switched, and then the re-encapsulated packet is sent to a node located in an Ethernet, so as to implement interconnection between the MPLS network and the Ethernet. An intermediate node in the solution may parse a packet and then re-encapsulate the packet when sending the packet from one network to another network, instead of transparent transmission only. Therefore, it is unnecessary to configure a MAC address of a remote node on a node located at the Ethernet and to configure VLAN information on a node located in the MPLS network, which may lower the configuration difficulty greatly.

Embodiment 3

According to the methods described in Embodiment 1 and Embodiment 2, Embodiment 3 gives an example to further describe the method in detail.

It is assumed that a service passes through Nodes A, B and C, and traverses an Ethernet and an MPLS network, in which Node A is located at the Ethernet, Node C is located at the MPLS network, and an Ethernet label is a VLAN tag. Therefore, the specific implementation of different packets may be as follows.

(I). Manner of Processing a Service Packet

First, it is necessary to establish a tunnel between Node A and Node B at the Ethernet and configure a corresponding VLAN tag for the service, to establish a tunnel between Node B and Node C at the MPLS network and configure a corresponding PW label for the service, and to configure a mapping relationship between the VLAN tag and the PW label at Node B.

By taking a service packet sent by Node A to Node C as an example, the process of transmitting the service packet is as follows.

(A-A1) After receiving a service packet, Node A performs Ethernet encapsulation on the service packet, that is, encapsulates the service packet with a MAC tag and a VLAN tag corresponding to the service, and sends the encapsulated service packet to Node B.

Figure 3:
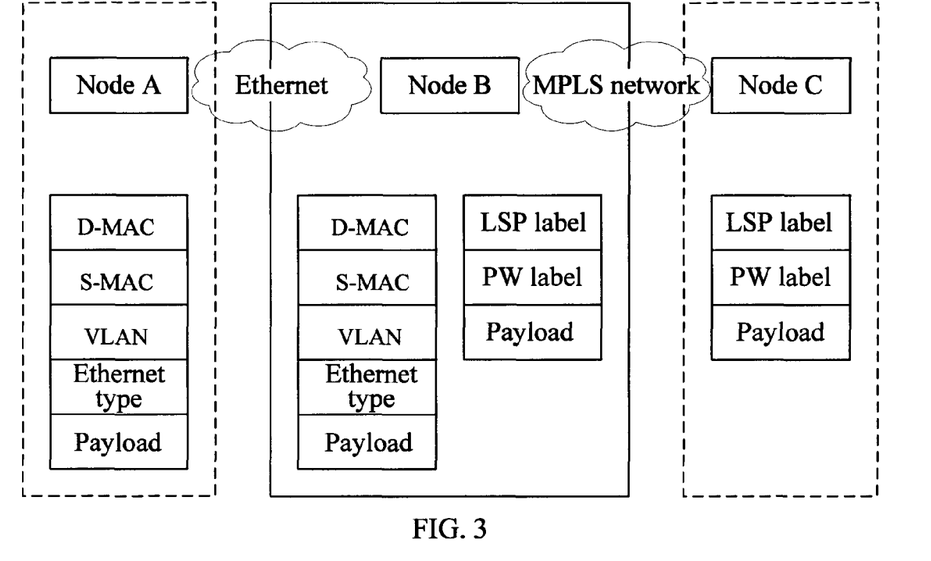
FIG. 3 is a schematic diagram of a transport protocol stack of a method according to an embodiment of the present invention.

Referring to FIG. 3, the MAC tag includes a MAC address of a source node and a MAC address of a destination node. For ease of description, in this embodiment, the MAC address of the source node is named as S-MAC, and the MAC address of the destination node is named as D-MAC. The D-MAC encapsulated by Node A is the address of Node B, the S-MAC is the address of Node A, and the VLAN tag is the VLAN tag configured for the service. Additionally, it is necessary to carry an Ethernet type (ETH type) and payload.

(A-A2) After receiving the service packet sent by Node A, Node B strips the MAC tag at an outsider layer of the service packet, switches the VLAN tag to a PW label according to a preset mapping relationship between VLAN tags and PW labels, and then encapsulates the service packet marked with the PW label into a corresponding MPLS tunnel for transmission (that is, perform MPLS encapsulation on the packet in which the label has been switched), so as to send the service packet to Node C. Referring to FIG. 3, certainly, since the packet is transmitted on the MPLS tunnel, it is necessary at this time to carry an MPLS tunnel label, that is, an LSP label.

It is necessary to configure Node B here, so that Node B does not strip the VLAN tag and instead, performs switch based on the VLAN tag, that is, in this solution, the VLAN tag may also be regarded as a PW, so that VLAN in the Ethernet and PW in the MPLS network may form a heterogeneous multi-hop PW.

(A-A3) Node C receives the service packet marked with the PW label, parses the service packet, and strips the PW label. Certainly, it is also necessary to strip the MPLS tunnel label, so as to obtain the payload.

The process of transmitting a reverse service packet, that is, a service packet sent from Node C to Node A is similar, but is only opposite to the action on Node B, that is, the PW label is mapped to the VLAN tag and then is sent to Ethernet for transmission, which is as follows.

(A-B1) After receiving a service packet, Node C performs MPLS encapsulation on the service packet, that is, encapsulates the service packet with a PW label corresponding to the service, and sends the encapsulated service packet to Node B.

(A-B2) After receiving the service packet sent by Node A, Node B parses the service packet, for example, switches the PW label to a VLAN tag according to a preset mapping relationship between VLAN tags and PW labels, determines a MAC tag corresponding to the service, and then encapsulates the service packet marked with the VLAN tag and the MAC tag to a corresponding Ethernet tunnel for transmission (that is, perform Ethernet encapsulation on the packet in which the label has been switched), so as to send the service packet to Node A.

Referring to FIG. 3, the MAC tag includes a MAC address of a source node (S-MAC) and a MAC address of a destination node (D-MAC), and at this time, the D-MAC encapsulated by the Node D is the address of Node A, and the S-MAC is the address of Node B.

It is necessary to make configuration on Node B here, so that Node B does not strip the PW label but performs switch based on the PW label, that is, map the PW label to the VLAN tag.

(A-B3) Node A receives the service packet marked with the VLAN tag and the MAC tag, parses the service packet, and strips the VLAN tag and the MAC tag. Certainly, it is necessary to strip an Ethernet tunnel label, so as to obtain payload.

(II) Manner of Processing an End-to-end OAM Packet, For Example, a Continuity Check (CC) or Automatic Protection Switching (APS) Packet Similarly, first, it is necessary to establish a tunnel between Node A and Node B at the Ethernet and configure a corresponding VLAN tag for the service, to establish a tunnel between Node B and Node C at the MPLS network and configure a corresponding PW label for the service, and to configure a mapping relationship between the VLAN tag and the PW label at Node B.

By taking a CC packet sent by Node A to Node C as an example, the process of transmitting the CC packet is as follows.

(B-A1) After receiving a CC packet, Node A performs Ethernet encapsulation on the CC packet, that is, encapsulates the CC packet with a MAC tag and a VLAN tag corresponding to the service, and sends the encapsulated CC packet to Node B.

Referring to FIG. 3, the MAC tag includes a MAC address of a source node and a MAC address of a destination node. For ease of description, in Embodiment 3, the MAC address of the source node is named as S-MAC, and the MAC address of the destination node is named as D-MAC. The D-MAC encapsulated by Node A is the address of Node B, the S-MAC is the address of Node A, and the VLAN tag is the VLAN tag configured for the service. In addition, it is necessary to carry an Ethernet type (ETH type) and payload.

(B-A2) After receiving the CC packet sent by Node A, Node B switches an Ethernet packet header to an MPLS header according to the manner of processing the service packet, that is, strips the MAC tag at an outer layer of the CC packet, switches the VLAN tag to a PW label according to a preset mapping relationship between VLAN tags and PW labels, and marks the CC packet with a PW label. In addition, it is necessary to convert an Ethernet PDU format of the CC packet into an MPLS PUD format of the CC packet. In addition, information of a corresponding opcode also needs to be converted. After the MPLS encapsulation on the CC packet is accomplished, the CC packet is sent to Node C through a corresponding MPLS tunnel. Referring to FIG. 3, certainly, since the packet is transmitted on the MPLS tunnel, it is necessary at this time to carry an MPLS tunnel label, that is, an LSP label.

It is necessary to make configure Node B here, so that Node B does not strip the VLAN tag but performs switch based on the VLAN tag, that is, in this solution, the VLAN tag may also be regarded as a PW, so that VLAN in the Ethernet and PW in the MPLS network may form a heterogeneous multi-hop PW.

(B-A3) Node C receives the CC packet marked with the PW label, parses the CC packet, and strips the PW label. Certainly, it is necessary to strip the MPLS tunnel label, so as to obtain the payload.

If the packet is an OAM packet that concerns an intermediate node, such as a loopback or linktrace packet, it is necessary to place information of a DA and an SA in an Ethernet OAM packet header into a PW OAM PDU. By taking a loopback packet sent by Node A to Node C as an example, the process is as follows.

In this case, in addition to the format conversion described above, it is necessary to place information of the DA and the SA in the Ethernet OAM packet header into the PW OAM PDU. For example, two domains are added in the PDU: a target maintenance entity group intermediate point address (target MIP address) and an originating maintenance entity group end point address (originating MEP address), so as to respectively carry information of the DA and the SA of the Ethernet OAM. A MIP node in the MPLS network may also judge whether the node is a loopback destination according to the target MIP address. If the node is the loopback destination, the node returns an LBR packet. The LBR packet also carries its own MAC address. When the LBR packet enters the Ethernet, the source address is mapped as the address.

The process of transmitting a reverse OAM packet, that is, an OAM packet sent from Node C to Node A is similar, but is only opposite to the action on Node B, that is, the PW label is mapped to the VLAN tag and then is sent to an Ethernet for transmission. By taking a CC packet as an example, the process is as follows.

(B-B1) After receiving a CC packet, Node C performs MPLS encapsulation on the CC packet, that is, encapsulates the CC packet with a PW label, and sends the encapsulated CC packet to Node B.

(B-B2) After receiving the CC packet sent by Node C, Node B switches an MPLS packet header to an Ethernet header according to the manner of processing the service packet, that is, switches the PW label to a VLAN tag according to a preset mapping relationship between VLAN tags and PW labels, determines a MAC tag corresponding to the service, and then marks the CC packet with the VLAN tag and the MAC tag. Furthermore, it is necessary to convert an MPLS PDU format of the CC packet into an Ethernet PUD format of the CC packet. In addition, information such as a corresponding opcode also needs to be converted. After Ethernet encapsulation on the CC packet is accomplished, the CC packet is sent to Node A through a corresponding Ethernet tunnel.

Referring to FIG. 3, the MAC tag includes a MAC address of a source node (S-MAC) and a MAC address of a destination node (D-MAC). At this time, the D-MAC encapsulated by the Node D is the address of Node A, and the S-MAC is the address of Node B.

It is necessary to configure Node B here, so that Node B does not strip the PW label and instead performs switch based on the PW label, that is, map the PW label to the VLAN tag.

(B-B3) Node A receives the service packet marked with the VLAN tag and the MAC tag, parses the service packet, and strips the VLAN tag and the MAC tag. Certainly, it is necessary to strip an Ethernet tunnel label, so as to obtain payload.

In view of the above, in Embodiment 3 of the present invention, a packet sent by a node located at an Ethernet is received, the packet is parsed, and the parsed packet is re-encapsulated by means of MPLS, that is, a VLAN tag is switched to a PW label according to a preset mapping relationship between VLAN tags and PW labels, MPLS encapsulation is performed on the packet in which the label has been switched, and then the re-encapsulated packet is sent to a node located at an MPLS network, so as to implement interconnection between the MPLS network and the Ethernet. A reverse solution of entering an Ethernet from an MPLS network is similar to this. An intermediate node in the solution may parse a packet and then re-encapsulate the packet when sending the packet from one network to another network, instead of transparent transmission only. Therefore, it is unnecessary to configure a MAC address of a remote node on a node located at the Ethernet and to configure VLAN information on a node located at the MPLS network, which may lower the configuration difficulty greatly.

Embodiment 4

The above description is about processing at a data level, and Embodiment 4 and Embodiment 5 give an example to describe processing at a signaling level.

Embodiment 4 gives description by taking that label mapping signaling enters an MPLS network from an Ethernet as an example. A first node is located at the Ethernet, and a third node is located at the MPLS network.

A method for interconnecting an MPLS network and an Ethernet is provided, where the method includes: receiving label mapping signaling sent by a first node located at the Ethernet, in which an Ethernet label for identifying a first hop PW, for example, VLAN tag is encapsulated in the label mapping signaling, and certainly, ERO information for indicating a next hop destination node may also be carried, generating new label mapping signaling and a PW label for identifying a second hop PW according to the received label mapping signaling, for example, the ERO information in the received label mapping signaling, encapsulating the PW label in the new label mapping signaling, and establishing a corresponding relationship between the Ethernet label and the PW label; and sending the encapsulated new label mapping signaling to a third node located at the MPLS network.

In addition to the manner of determining a next hop according to the ERO information, another manner, for example, of determining the next hop according to an address of the other end of a PW, may also be adopted.

A mapping relationship between Ethernet labels and PW labels may be established by adopting the solution, so that switch between Ethernet labels and PW labels may be accomplished according to the mapping relationship in the following packet transmission.

Embodiment 5

Different from Embodiment 4, Embodiment 5 gives description by taking that label mapping signaling enters an Ethernet from an MPLS network as an example. A first node is located at the Ethernet, and a third node is located at the MPLS network.

A method for interconnecting an MPLS network and an Ethernet is provided, where the method includes: receiving label mapping signaling sent by a third node located at the MPLS network, in which a PW label for identifying a second hop PW is encapsulated in the label mapping signaling, and certainly, ERO information for indicating a next hop destination node may be carried; generating new label mapping signaling and an Ethernet label, for example, VLAN tag, according to the received label mapping signaling, for example, the ERO information in the received label mapping signaling, encapsulating the Ethernet label in the new label mapping signaling, and establishing a corresponding relationship between the Ethernet label and the PW label; and sending the encapsulated new label mapping signaling to a first node located at the Ethernet.

In addition to the manner of determining a next hop according to the ERO information, another manner, for example, of determining the next hop according to an address of the other end of a PW, may also be adopted.

A mapping relationship between Ethernet labels and PW labels may be established by adopting the solution, so that switch between Ethernet labels and PW labels may be accomplished according to the mapping relationship in the following packet transmission.

Embodiment 6

Description is provided below in detail by giving an example (by taking an Ethernet label as a VLAN tag as an example) according to the methods in Embodiments 4 and 5.

The processing manner of end-to-end "multi-hop PW" signaling is taken as an example.

Label distribution protocol (LDP) signaling is also supported in the Ethernet, and a PW label type is expanded as a VLAN tag. By taking that Node A initiates signaling establishment (that is, establish a mapping relationship between PW and VLAN) as an example, the process is as follows.

(C-A1) Node A initiates label mapping signaling carrying a B-A direction PW label, that is, a VLAN tag, and carrying ERO for indicating a next hop destination node.

(C-A2) After receiving the label mapping signaling, Node B determines according to the ERO information that the next hop destination node is Node C, generates new label mapping signaling, in which the new label mapping signaling carries a C-B direction PW label, establishes a corresponding relationship between the VLAN tag and the PW label, and sends the new label mapping signaling to Node C through a corresponding MPLS tunnel.

(C-A3) After receiving the new label mapping signaling, Node C parses the received new label mapping signaling, and then may initiate to establish label mapping signaling in another direction of the "multi-hop PW," that is, establish label mapping signaling from Node C to Node A, of which the processing is similar to those in Embodiments 1 and 2 and is as follows.

(C-B1) Node C initiates label mapping signaling carrying a B-C direction PW label, and carrying ERO for indicating a next hop destination node.

(C-B2) After receiving the label mapping signaling, Node B determines according to the ERO information that the next hop destination node is Node A, generates new label mapping signaling, in which the new label mapping signaling carries a C-B direction PW label, that is, a VLAN tag, establishes a corresponding relationship between the VLAN tag and the PW label, and sends the new label mapping signaling to Node A through a corresponding Ethernet tunnel.

(C-B3) After receiving the new label mapping signaling, Node A parses the received new label mapping signaling.

In view of the above, in Embodiment 6 of the present invention, signaling sent by a node located at an Ethernet is received, the signaling is parsed, new signaling is generated, a PW label is encapsulated in the signaling, a mapping relationship between a VLAN tag and the PW label is established, and then the re-encapsulated signaling is sent to a node located at an MPLS network, so as to implement interconnection between the MPLS network and the Ethernet. A reverse solution of entering an Ethernet from an MPLS network is similar to this. By adopting this solution, a mapping relationship between a VLAN tag and a PW label may be established, so that switch between the VLAN tag and the PW label may be accomplished according to the mapping relationship in the following packet transmission.

Embodiment 7

Figure 4:
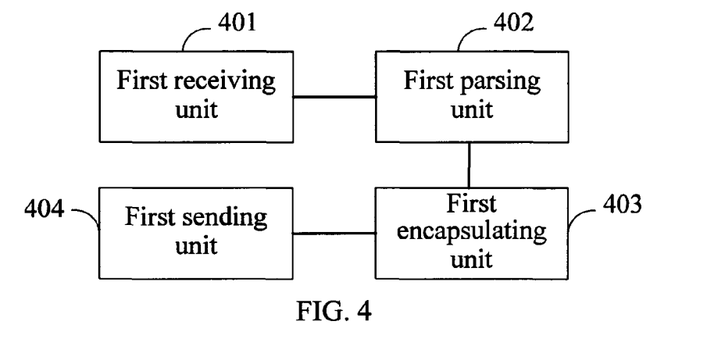
FIG. 4 is a schematic structural diagram of a network device according to an embodiment of the present invention.

To better implement the above method, an embodiment of the present invention provides a network device, as shown in FIG. 4, which includes a first receiving unit 401, a first parsing unit 402, a first encapsulating unit 403 and a first sending unit 404.

The first receiving unit 401 is configured to receive a packet sent by a first node located at an Ethernet, in which an Ethernet label is encapsulated in the packet (that is, receive a packet encapsulated by means of Ethernet), in which, certainly, a MAC tag may also be carried (that is, encapsulated) in the packet; for example, receive a service packet sent by the first node, in which a MAC tag and an Ethernet label (VLAN MAC) are encapsulated in the service packet; or, receive an OAM packet sent by the first node, in which the OAM packet encapsulates a MAC tag and an Ethernet label; or, receive label mapping signaling sent by the first node, in which the label mapping signaling carries a MAC tag, an Ethernet label and ERO information for indicating a next hop destination node.

The first parsing unit 402 is configured to parse the packet encapsulated by means of Ethernet received by the first receiving unit 401, and switch the Ethernet label to a PW label according to a preset mapping relationship between Ethernet labels and PW labels, in which, certainly, strip the MAC tag of the packet received by the first receiving unit 401 at this time; for example, strip the MAC tag of the received service packet, or OAM packet, or label mapping signaling, and switch the Ethernet label to a PW label according to a preset mapping relationship between Ethernet labels and PW labels.

The first encapsulating unit 403 is configured to perform MPLS encapsulation on the packet parsed by the first parsing unit 402, that is, perform MPLS encapsulation on the packet in which the first parsing unit 402 has switched the label; for example, perform MPLS encapsulation on the service packet in which the first parsing unit 402 has switched the label; or perform MPLS encapsulation on the OAM packet in which the first parsing unit 402 has switched the label, and convert an Ethernet PDU format into an MPLS PDU format.

The first sending unit 404 is configured to send the packet encapsulated by the first encapsulating unit 403 to a third node located at an MPLS network.

The Ethernet label may be a VLAN tag, an I-SID tag or a MAC address.

Please refer to the previous embodiments for specific implementation of each unit, which is not repeated here.

In view of the above, the first receiving unit 401 of the network device according to Embodiment 7 of the present invention receives a packet sent by a node located at an Ethernet, the first parsing unit 402 parses the packet, that is, switch the Ethernet label to a PW label according to a preset mapping relationship between Ethernet labels and PW labels, the first encapsulating unit 403 performs MPLS encapsulation on the service packet in which the label has been switched, and the first sending unit 404 then sends the encapsulated packet to a node located at an MPLS network, so as to implement interconnection between the MPLS network and the Ethernet. An intermediate node in the solution may parse a packet and then re-encapsulate the packet when sending the packet from one network to another network, instead of transparent transmission only. Therefore, it is unnecessary to configure a MAC address of a remote node on a node located at the Ethernet and to configure VLAN information on a node located at the MPLS network, which may lower the configuration difficulty greatly.

Embodiment 8

Figure 5:
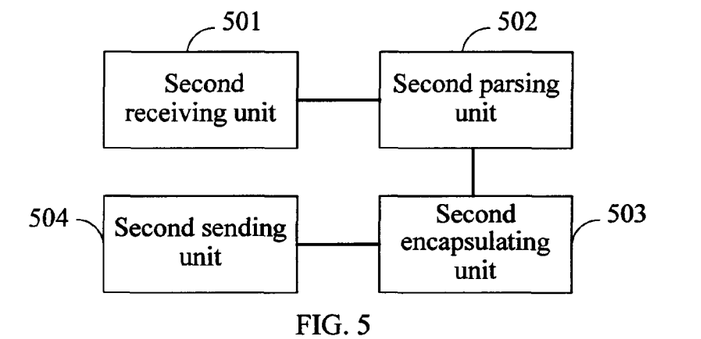
FIG. 5 is a schematic structural diagram of another network device according to an embodiment of the present invention.

Embodiment 8 of the present invention further provides another network device correspondingly, as shown in FIG. 5, which includes a second receiving unit 501, a second parsing unit 502, a second encapsulating unit 503 and a second sending unit 504.

The second receiving unit 501 is configured to receive a packet sent by a third node located at an MPLS network, in which a PW label is encapsulated in the packet (that is, receive a packet encapsulated by means of MPLS); for example, receive a service packet sent by the third node, in which a PW label is encapsulated in the service packet; or, receive an OAM packet sent by the third node, in which a PW label is encapsulated in the OAM packet; or, receive label mapping signaling sent by the third node, in which a PW label and ERO information are carried in the label mapping signaling.

The second parsing unit 502 is configured to parse the packet encapsulated by means of MPLS received by the second receiving unit 501, that is, switch the PW label in the packet received by the second receiving unit 501 to an Ethernet label according to a preset mapping relationship between Ethernet labels and PW labels, and determine a corresponding MAC tag; for example, switch the PW label in the received service packet, or OAM packet, or label mapping signaling to an Ethernet label according to a preset mapping relationship between Ethernet labels and PW labels, and determine a corresponding MAC tag.

The second encapsulating unit 503 is configured to perform Ethernet encapsulation on the packet parsed by the second parsing unit 502, that is, perform Ethernet encapsulation on the packet in which the second parsing unit 502 has switched the label; for example, perform Ethernet encapsulation on the service packet in which the second parsing unit 502 has switched the label; or perform Ethernet encapsulation on the OAM packet in which the second parsing unit 502 has switched the label, and convert an MPLS PDU format into an Ethernet PDU format.

The second sending unit 504 is configured to send the packet encapsulated by the second encapsulating unit 503 to a first node located at an Ethernet.

Please refer to the previous embodiment for specific implementation of each unit, which is not repeated here.

During specific implementation, the network device in Embodiment 7 and the network device in Embodiment 8 may be implemented by one same entity, or may be implemented by different entities.

In view of the above, the second receiving unit 501 of the network device according to Embodiment 8 of the present invention receives a packet sent by a node located at an MPLS network, the second parsing unit 502 parses the packet, that is, switches the PW label in the packet to an Ethernet label according to a preset mapping relationship between Ethernet labels and PW labels, the second encapsulating unit 503 performs Ethernet encapsulation on the packet in which the label has been switched, and the second sending unit 504 sends the encapsulated packet to a node located at an Ethernet, so as to implement interconnection between the MPLS network and the Ethernet. An intermediate node in the solution may parse a packet and then re-encapsulate the packet when sending the packet from one network to another network, instead of transparent transmission only. Therefore, it is unnecessary to configure a MAC address of a remote node on a node located at the Ethernet and to configure VLAN information on a node located at the MPLS network, which may lower the configuration difficulty greatly.

Embodiment 9

Figure 6:
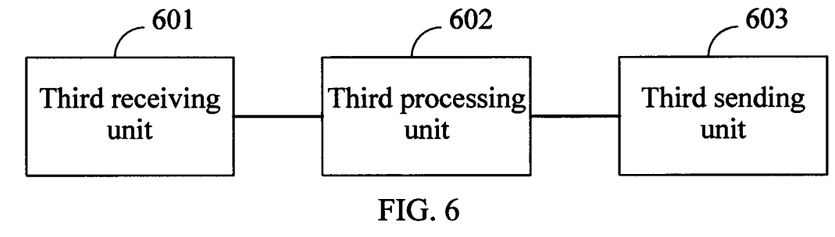
FIG. 6 is a schematic structural diagram of yet another network device according to an embodiment of the present invention.

Embodiment 9 of the present invention further provides another network device. As shown in FIG. 6, the network device includes a third receiving unit 601, a third processing unit 602 and a third sending unit 603.

The third receiving unit 601 is configured to receive label mapping signaling sent by a first node located at an Ethernet, in which an Ethernet label for identifying a first hop PW, for example, a VLAN tag, is encapsulated in the label mapping signaling; and certainly, ERO information for indicating a next hop destination node may also be carried.

The third processing unit 602 is configured to generate new label mapping signaling and a PW label for identifying a second hop PW according to the label mapping signaling received by the third receiving unit 601, for example, the ERO information carried in the label mapping signaling, encapsulate the PW label in the new label mapping signaling, and establish a corresponding relationship between the VLAN tag and the PW label.

The third sending unit 603 is configured to send the new label mapping signaling encapsulated by the third processing unit 602 to a third node located at an MPLS network.

Please refer to the method embodiments for specific implementation of each unit, which is not repeated here.

In view of the above, in Embodiment 9 of the present invention, the third receiving unit 601 receives signaling sent by a node located at an Ethernet, the third processing unit 602 parses the signaling, generates new signaling, encapsulates a PW label in the signaling, and at the same time establishes a mapping relationship between the Ethernet label and the PW label, and then the third sending unit 603 sends the re-encapsulated signaling to a node located at an MPLS network, so as to implement interconnection between the MPLS network and the Ethernet. By adopting this solution, a mapping relationship between an Ethernet label and a PW label may be established, so that switch between the Ethernet label and the PW label may be accomplished according to the mapping relationship in the following packet transmission.

Embodiment 10

Embodiment 10 of the present invention further provides another network device. As shown in FIG. 6, the network device includes a fourth receiving unit 701, a fourth processing unit 702 and a fourth sending unit 703.

Figure 7:
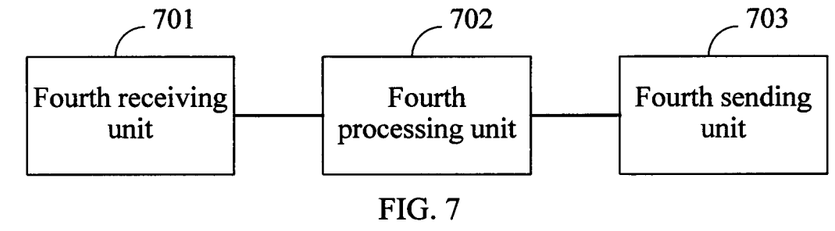
FIG. 7 is a schematic structural diagram of a further network device according to an embodiment of the present invention.

The fourth receiving unit 701 is configured to receive label mapping signaling sent by a third node located at an MPLS network, in which a PW label for identifying a second hop PW is encapsulated in the label mapping signaling; and certainly, ERO information for indicating a next hop destination node may also be carried.

The fourth processing unit 702 is configured to generate new label mapping signaling and an Ethernet label, for example, a VLAN tag, according to the label mapping signaling received by the fourth receiving unit 701, for example, the ERO information carried in the label mapping signaling, encapsulate the Ethernet label in the new label mapping signaling, and establish a corresponding relationship between the Ethernet label and the PW label.

The fourth sending unit 703 is configured to send the new label mapping signaling encapsulated by the fourth processing unit 702 to a first node located at an Ethernet.

The Ethernet label may be a VLAN tag, an I-SID tag or a MAC address.

Please refer to the method embodiment for specific implementation of each unit, which is not repeated here.

During specific implementation, the network device in Embodiment 9 and the network device in Embodiment 10 may be implemented by one same entity, or may be implemented by different entities. In addition, the network devices in Embodiments 7, 8, 9, and 10 may be implemented by one same entity, or may be implemented by different entities.

In view of the above, in Embodiment 10 of the present invention, the fourth receiving unit 701 receives signaling sent by a node located at an MPLS network, the fourth processing unit 702 parses the signaling, generates new signaling, encapsulates a PW label in the signaling, and at the same time establishes a mapping relationship between the Ethernet label and the PW label, and then the fourth sending unit 703 sends the re-encapsulated signaling to a node located at an Ethernet, so as to implement interconnection between the MPLS network and the Ethernet. By adopting this solution, a mapping relationship between an Ethernet label and a PW label may be established, so that switch between the Ethernet label and the PW label may be accomplished according to the mapping relationship in the following packet transmission.

Embodiment 11

Figure 8:
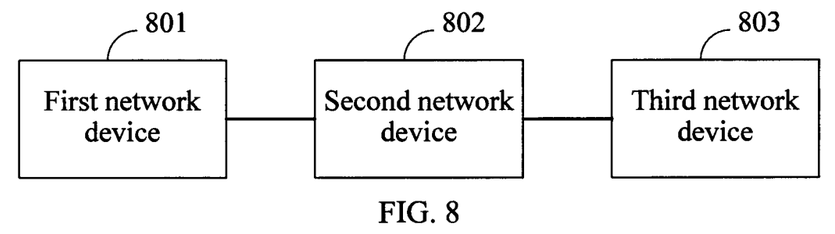
FIG. 8 is a schematic structural diagram of a communication system according to an embodiment of the present invention.

Embodiment 11 of the present invention further provides a communication system correspondingly, as shown in FIG. 8, which includes a first network device 801, a second network device 802 and a third network device 803.

The first network device 801 is configured to send a packet to the second network device 802, in which an Ethernet label is encapsulated in the packet; and certainly, the packet may also carry a MAC tag.

The second network device 802 is configured to receive the packet sent by the first network device 801 located at an Ethernet, switch the Ethernet label in the packet to a PW label according to a preset mapping relationship between Ethernet labels and PW labels, perform MPLS encapsulation on the packet in which the label has been switched, and send the encapsulated packet to the third network device 803 located at an MPLS network; and certainly, the second network device 802 may also strip the MAC tag of the received packet.

The third network device 803 is configured to receive the packet sent by the second network device 802 located at the MPLS network and parse the service packet.

The second network device 802 is any network device in Embodiment 7, which may be the first receiving unit 401, the first parsing unit 402, the first encapsulating unit 403 or the first sending unit 404.

The Ethernet label may be a VLAN tag, an I-SID tag or a MAC address.

Please refer to the previous embodiment for specific implementation of each unit, which is not repeated here.

In view of the above, the second network device 802 of the communication system according to Embodiment 11 of the present invention receives a packet sent by the first network device 801 located at an Ethernet, parses the packet, re-encapsulates the parsed packet by means of MPLS, that is, switches the Ethernet label to a PW label according to a preset mapping relationship between Ethernet labels and PW labels, performs MPLS encapsulation on the packet in which the label has been switched, and sends the re-encapsulated service packet to the third network device 803 located at an MPLS network, so as to implement interconnection between the MPLS network and the Ethernet. An intermediate node in the solution may parse a packet and then re-encapsulate the packet when sending the packet from one network to another network, instead of transparent transmission only. Therefore, it is unnecessary to configure a MAC address of a remote node on a node located at the Ethernet and to configure VLAN information on a node located at the MPLS network, which may lower the configuration difficulty greatly.

Embodiment 12

Figure 9:
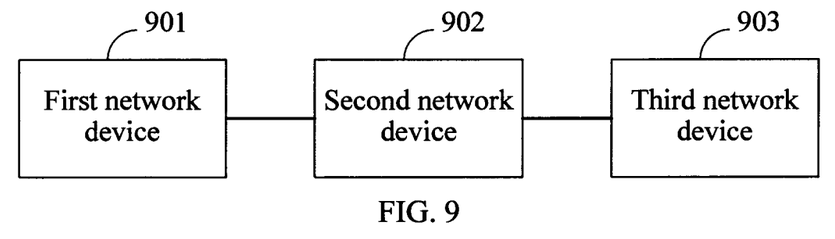
FIG. 9 is a schematic structural diagram of another communication system according to an embodiment of the present invention.

Embodiment 12 of the present invention further provides another communication system correspondingly, as shown in FIG. 9, which includes a first network device 901, a second network device 902 and a third network device 903.

The third network device 903 is configured to send a packet to the second network device 902, in which a PW label is encapsulated in the packet.

The second network device 902 is configured to receive the packet sent by the third network device 903 located at an MPLS network, switch the PW label in the packet to an Ethernet label according to a preset mapping relationship between Ethernet labels and PW labels, perform Ethernet encapsulation on the packet in which the label has been switched, and send the encapsulated packet to the first network device 901 located at an Ethernet; in which the second network device 902 may also determine a corresponding MAC tag and encapsulate the MAC tag in the packet.

The first network device 901 is configured to receive the packet sent by the second network device 902 and parse the service packet.

The second network device 902 is any network device in Embodiment 8, which may be the second receiving unit 501, the second parsing unit 502, the second encapsulating unit 503 or the second sending unit 504.

The Ethernet label may be a VLAN tag, an I-SID tag or a MAC address.

Please refer to the previous embodiment for specific implementation of each unit, which is not repeated here.

In view of the above, the second network device 902 of the communication system according to Embodiment 12 of the present invention receives a packet sent by the third network device 903 located at an MPLS network, parses the packet, re-encapsulates the parsed packet by means of Ethernet, that is, switches the PW label to an Ethernet label according to a preset mapping relationship between Ethernet labels and PW labels, performs Ethernet encapsulation on the packet in which the label has been switched, and sends the re-encapsulated service packet to the first network device 901 located at an Ethernet, so as to implement interconnection between the MPLS network and the Ethernet. An intermediate node in the solution may parse a packet and then re-encapsulate the packet when sending the packet from one network to another network, instead of transparent transmission only. Therefore, it is unnecessary to configure a MAC address of a remote node on a node located at the Ethernet and to configure VLAN information on a node located at the MPLS network, which may lower the configuration difficulty greatly.

Persons of ordinary skill in the art should understand that all or a part of the steps in the method of the embodiments may be accomplished through a program instructing related hardware. The program may be stored in a computer readable storage medium including a read only memory (ROM), a random access memory (RAM), a magnetic disk or an optical disk.

The method, device and system for interconnecting an MPLS network and an Ethernet are illustrated in detail in the embodiments of the present invention. Examples are provided to describe the principle and implementation of the present invention, and the above embodiments are only used to facilitate understanding of the method and the core idea of the present invention. Meanwhile, persons of ordinary skill in the art can make modifications and variations on the implementation and application of the present invention without departing from the spirit thereof. Therefore, the present invention is not limited to the above disclosure.

What is claimed is:

1. A method for interconnecting a multi-protocol label switching (MPLS) network and an Ethernet, comprising:
   receiving a packet sent by a node located at the Ethernet, wherein an Ethernet label is encapsulated in the packet;
   switching the Ethernet label in the packet to a pseudo wire (PW) label according to a preset mapping relationship between Ethernet labels and PW labels;
   performing MPLS encapsulation on the packet in which the label has been switched; and
   sending the encapsulated packet to a node located at the MPLS network;
   wherein the Ethernet label includes a Destination Media Access Control (D-MAC) address, a Source Media Access Control (S-MAC) address, and a Virtual Local Area Network (VLAN) tag, and
   the switching the Ethernet label in the racket to the PW label comprises:
   removing the D-MAC and S-MAC addresses; and
   switching the VLAN tag with the PW label.

2. The method according to claim 1, wherein the receiving a packet sent by the node located at the Ethernet comprises:
   receiving a service packet sent by the node located at the Ethernet.

3. The method according to claim 2, wherein when the received packet is the OAM packet, after the switching the Ethernet label in the packet to the PW label, the method further comprises:
   converting an Ethernet protocol data unit (PDU) format into an MPLS PDU format.

4. The method according to claim 3, further comprising:
   placing information of a destination address (DA) and a source address (SA) in an Ethernet OAM packet header in a PW OAM PDU.

5. The method according to claim 1, wherein the performing MPLS encapsulation comprises adding an MPLS tunnel label to the packet.

6. The method according to claim 1, wherein the receiving a packet sent by the node located at the Ethernet comprises:
   receiving an operation, administration and management (OAM) packet sent by the node located at the Ethernet.

7. A method for interconnecting a multi-protocol label switching (MPLS) network and an Ethernet, comprising:
   receiving label mapping signaling sent by a node located at the Ethernet, wherein an Ethernet label for identifying a first hop pseudo wire (PW) is encapsulated in the label mapping signaling;
   generating new label mapping signaling and a PW label for identifying a second hop PW according to the label mapping signaling, encapsulating the PW label in the new label mapping signaling, and establishing a corresponding relationship between the Ethernet label and the PW label; and
   sending the new label mapping signaling to a node located at the MPLS network;

wherein the Ethernet label includes an Explicit Route Object (ERO) and a Virtual Local Area Network (VLAN) tag.

8. The method according to claim 7, wherein the generating new label mapping signaling and the PW label is based on the ERO and the encapsulating the PW label in the new label mapping signaling switches the ULAN tag with the PW label.

9. A network device, comprising:
a receiving unit, configured to receive a packet sent by a node located at an Ethernet, wherein an Ethernet label is encapsulated in the packet;
a parsing unit, configured to switch the Ethernet label in the packet to a pseudo wire (PW) label according to a preset mapping relationship between Ethernet labels and PW labels;
an encapsulating unit, configured to perform a multi-protocol label switching (MPLS) encapsulation on the packet in which the parsing unit has switched the label; and
a sending unit, configured to send the packet encapsulated by the encapsulating unit to a node located at an MPLS network;
wherein the Ethernet label includes a Destination Media Access Control (D-MAC) address, a Source Media Access Control (S-MAC) address, and a Virtual Local Area Network (VLAN) tag, and the parsing unit is configured to remove the D-MAC and S-MAC addresses and switch the VLAN tag with the PW label.

10. A network device, comprising:
a receiving unit, configured to receive a packet sent by a node located at a multi-protocol label switching (MPLS) network, wherein a pseudo wire (PW) label is encapsulated in the packet;
a parsing unit, configured to switch the PW label in the packet received by the receiving unit to an Ethernet label according to a preset mapping relationship between Ethernet labels and PW labels;
a encapsulating unit, configured to perform Ethernet encapsulation on the packet in which the parsing unit has switched the label; and
a sending unit, configured to send the packet encapsulated by the encapsulating unit to a node located at an Ethernet;
wherein the Ethernet label includes a Virtual Local Area Network (VLAN) tag, and the parsing unit is further configured to determine a Media Access Control (MAC) tag and add the MAC tag to the packet received by the receiving unit, the MAC tag comprises a Destination Media Access Control (D-MAC) address, a Source Media Access Control (S-MAC) address.

* * * * *